United States Patent Office 2,985,656
Patented May 23, 1961

2,985,656
ANTHRAQUINONE VAT DYESTUFFS
Kurt Weber, Bottmingen, Switzerland, assignor to Ciba Limited, Basel, Switzerland
No Drawing. Filed Feb. 21, 1958, Ser. No. 716,533
Claims priority, application Switzerland Mar. 22, 1957
8 Claims. (Cl. 260—249)

This invention provides anthraquinone vat dyestuffs of the general formula

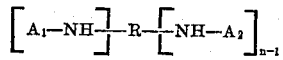

in which $A_1$ represents an anthraquinone radical which is bound to the —NH— group in the 1-position and contains in the 6- or 7-position an alkoxy group of low molecular weight, $A_2$ represents an anthraquinone radical, $n$ is the whole number 1, 2 or 3, and R represents the radical of a carboxylic acid or of a 6-membered heterocyclic compound containing at least once the grouping of the formula

The invention also provides a process for the manufacture of the dyestuffs of the above general formula, wherein one or more aminoanthraquinones at least one of which is a 1-aminoanthraquinone containing in the 6- or 7-position an alkoxy group of low molecular weight, is or are reacted with a reactive derivative of an organic carboxylic acid or with a 6-membered heterocyclic compound containing at least once the grouping of the formula

The alkoxy group of low molecular weight in the 6- or 7-position of the 1-aminoanthraquinones used as starting materials preferably contains at most 4 carbon atoms and may be, for example, a butoxy, propyloxy, ethoxy or, more especially, a methoxy group. In addition to the substituents mentioned above, the anthraquinone nucleus may contain further substituents, for example, a nitro, amino or acylamino group in the 5- or 8-position, as, for example, in the case of 1-amino-5-nitro-6-methoxy- or 1-amino-5-benzoylamino-6- or -7-methoxy-anthraquinone.

Of special interest are those starting materials which contain in the 1- and 4-positions an amino group, for example, 1:4-diamino-6- or -7-methoxyanthraquinone.

It is also of advantage to use for the acylation a mixture of a 1-amino-6-alkoxyanthraquinone and a 1-amino-7-alkoxyanthraquinone. Such mixtures can be obtained by the process of German Patent No. 167,699 to Farbwerke vorm. Meister Lucius and Bruning in Hochst a. M., patented November 8, 1904 by reacting the mixture of 1:6- and 1:7-dinitroanthraquinone, which is obtained in a yield of about 20% as a by-product of the dinitration of anthraquinone to form 1:5- and 1:8-dinitroanthraquinone, with 1 molecular proportion of an alkali metal alcoholate at a low temperature, whereby only the nitro groups in β-position are replaced by alkoxy groups, and then reducing with sodium sulfide the mixture of nitro-alkoxy-anthraquinones so obtained. Pure 1-amino-6-methoxy-anthraquinone can be obtained by adding to the mother liquor remaining after the separation of 1:5- and 1:8-dinitroanthraquinone a quantity of water such that only 1:6-dinitroanthraquinone is precipitated, the latter compound constituting about 15% of the total quantity of dinitroanthraquinones. The 1:6-dinitroanthraquinone so obtained is then reacted with an alkali metal alcoholate and subsequently reduced.

The 1-amino-6- or -7-alkoxyanthraquinone or -anthraquinones is or are reacted with a reactive derivative of an organic mono-, di- or tri-carboxylic acid with the formation of an acid amide. A very wide variety of carboxylic acids may be used, for example, aliphatic carboxylic acids, for example, acetic acid, butyric acid, or oxalic acid; alicyclic carboxylic acids, for example, hexahydrobenzoic acid; and especially aromatic carboxylic acids, for example, benzoic acid, and substitution products thereof, especially halogen-benzoic acids, for example, ortho- or para-chlorobenzoic acid, 2:5-dichlorobenzoic acid, ortho-fluorobenzoic acid, para-bromo-benzoic acid, or alkoxy-benzoic acids, especially 3-methoxy-benzoic acid, or alkyl-substituted benzoic acids, for example, para-toluylic acid or 3-trifluoromethyl-benzoic acid, cyanobenzoic acid, dialkyl-sulfonamido-benzoic acids, especially para-dimethyl-sulfonamido-benzoic acid. Among dicyclic and polycyclic aromatic monocarboxylic acids there may be mentioned α- or β-naphthoic acid, para-diphenyl-carboxylic acid, anthraquinone-2-carboxylic acid and 1-amino-2-anthraquinone carboxylic acid.

Of special interest are derivatives of aromatic di- or tri-carboxylic acids, for example, those of the benzene series, such as phthalic acid, isophthalic acid, terephthalic acid or benzene-1:3:5-tricarboxylic acid, or dicyclic or polycyclic aromatic carboxylic acids, for example, naphthalene-2:6- or -2:7-dicarboxylic acid, 4:4'-diphenyl-dicarboxylic acids, azo-benzene-dicarboxylic acids, for example, 4:4'- or 3:3'-azobenzene dicarboxylic acid, 2:2'-dimethyl- or 2:2'-dichloro-azobenzene-5:5'-dicarboxylic acid, and also azo-diphenyl dicarboxylic acid, fluoranthene-4:12-dicarboxylic acid, benzanthrone-2:6-dicarboxylic acid or anthraquinone-2:6-dicarboxylic acid. There may also be mentioned derivatives of heterocyclic carboxylic acids, for example, pyridine carboxylic acids, especially pyridine-3-carboxylic acid, and quinoline carboxylic acids, especially quinoline -6-carboxylic acid, quinoline-5:7- or -5:8-dicarboxylic acid, or 1:9-anthrapyrimidine-2-carboxylic acid, and also furane-1-carboxylic acid or thiophene-1-carboxylic acid, benzthiazole carboxylic acid, and also dicarboxylic acids of the type

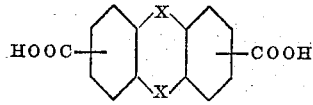

in which each X represents —O—, —S—, —SO— or —SO$_2$—, for example, thianthrene- or diphenylene-dioxide-dicarboxylic acids. As further examples of heterocyclic carboxylic acids there may be mentioned the following dicarboxylic acids derived from oxdiazole:

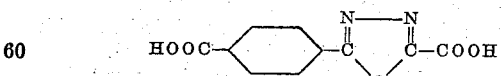

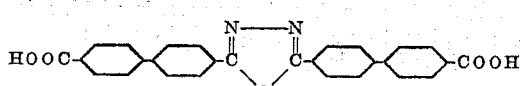

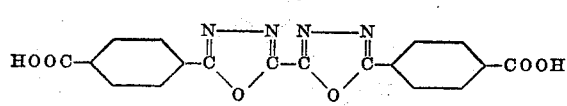

and also diphenylene-oxide-dicarboxylic acids and diphenylene-sulfide-dicarboxylic acids.

Those 1-amino-6- or -7-alkoxy-anthraquinones which contain only one amino group are advantageously reacted with derivatives of dicarboxylic acids or tricarboxylic acids, and those 1-amino-6- or -7-alkoxyanthraquinones which contain further amino groups are advantageously acylated with derivatives of monocarboxylic acids. In the former case two or three molecular proportions of the 1-amino-6- or -7-methoxyanthraquinone may be reacted with 1 molecular proportion of a dicarboxylic acid derivative or tricarboxylic acid derivative, respectively, whereby symmetrical dicarboxylic acid diamides are obtained. Alternatively, asymmetrical diamides or triamides are obtained by reacting a di- or tri-carboxylic acid derivative with two different aminoanthraquinones, of which one must be a 1-amino-6- or -7-alkoxyanthraquinone as defined above. The other aminoanthraquinone may be of any kind, for example, one of the following aminoanthraquinones:

1-aminoanthraquinone
2-aminoanthraquinone
1-amino-4- or -5-benzoylaminoanthraquinone
1-amino-4-methoxyanthraquinone
4-amino-2:1-(N)-anthraquinone-benzacridone
4- or 5-aminoanthrapyrimidine
4-amino-1:1'-dianthrimide.

Alternatively, there may be used any 6-membered heterocyclic acylating agent which contains at least once the radical of the formula

for example, dihalogen-diazines, for example, dihalogen-quinazolines, and especially trihalogen-triazines of which cyanuric chloride is the most important compound. Two of the halogen atoms of the cyanuric chloride can usually be exchanged for aminoanthraquinone radicals under relatively mild conditions. The exchange of the third halogen atom requires more energetic conditions. Accordingly, when one molecular proportion of a cyanuric halide is reacted with two molecular proportions of the aminoanthraquinone the third halogen atom of the cyanuric radical remains unreacted, and may be reacted with a suitable compound, for example, with ammonia, a primary or secondary amine, and advantageously an aliphatic amine or an amine of the benzene series. As examples of such amines there may be mentioned: Aniline, N-methylaniline, N-ethylaniline, methylamine, ethylamine, dibutylamine, 1-naphthylamine, 1-aminoanthraquinone and 2-aminopyridine. This reaction can be carried out in the same vessel without isolating the intermediate product from the reaction mixture.

The condensations are advantageously carried out by reacting the aminoanthraquinones with the acylating agents in a solvent or suspension medium, for example, nitrobenzene, chlorobenzene, naphthalene, toluene or glacial acetic acid, for a sufficient time, and according to requirements using a lower or higher temperature, and, when necessary, a condensing agent, for example, cuprous chloride, or in the presence of another assistant, for example, an agent capable of binding hydrogen halide. A solvent or suspension medium may be dispensed with by simply melting the components together, if desired, with the use of appropriate additions for this purpose.

Especially valuable are those anthraquinone vat dyestuffs of the formula first given above, in which $n$ is the whole number 2 or 3, and $A_1$ and $A_2$ each represent a residue of the formula

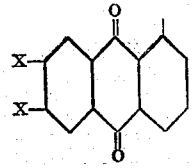

in which one X represents a methoxy group and the other X a hydrogen atom. These compounds are valuable vat dyestuffs yielding yellow dyeings.

Valuable vat dyestuffs yielding red dyeings are the compounds of the formula

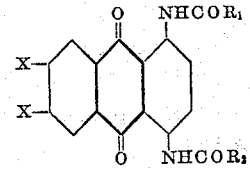

in which $R_1$ and $R_2$ represent identical or preferably different radicals of aromatic monocarboxylic acids, especially those of the benzene series.

The dyestuffs of this invention are suitable for dyeing or printing a very wide variety of materials, especially for dyeing or printing fibers of natural or regenerated cellulose. The dyeings so obtained are distinguished by their good properties of fastness. The dyestuffs of the invention are also useful as pigments. Those dyestuffs that are derived from monocarboxylic acids of low molecular weight can be used for dyeing polyethylene terephthalate fibers from aqueous dispersion.

As compared with the isomeric dyestuffs described in French Patent No. 844,756 to I. G. Farbenindustrie Aktiengesellschaft Nfg., granted April 24, 1939, which are obtained by condensing two molecular proportions of 1-amino-5-alkoxy-anthraquinones with one molecular proportion of a benzene dicarboxylic acid, the dyestuffs of the present invention are distinguished by their considerably better fastness to light.

The following examples illustrate the invention, the parts and percentages being by weight:

Example 1

2.8 parts of a mixture of 1-amino-6-methoxy-anthraquinone and 1-amino-7-methoxy-anthraquinone and 1-part of cryanuric chloride are heated in 25 parts of nitrobenzene for 14–17 hours at 130° C. After cooling the mixture, the dyestuff is filtered off. When dry it is a yellow-brown powder which dyes cellulose powders from a red-orange vat yellow tints having good properties of fastness.

By using, instead of the above mixture, 1-amino-6-methoxy-anthraquinone alone, there is obtained a dyestuff which dyes cotton somewhat more greenish yellow tints.

Example 2

2.8 parts of a mixture of 1-amino-6-methoxy-anthraquinone and 1-amino-7-methoxyanthraquinone and 1 part of cyanuric chloride are condensed in 25 parts of nitrobenzene in the manner described in Example 1. After filtering off the dyestuff so obtained, it is reacted in 80 parts of nitrobenzene with dry ammonia gas at 140–150° C. for 12 hours. The dyestuff so obtained is a yellow-brown powder, which dyes cotton and viscose artificial silk from a red-orange vat golden yellow tints having good properties of fastness.

By using, instead of the above mixture, 1-amino-6-methoxy-anthraquinone alone there is obtained a dyestuff which dyes cotton somewhat more greenish tints.

Example 3

1.5 parts of the dyestuff obtained as described in Example 1 are heated with 1 part of aniline in 30 parts of nitrobenzene for 18 hours at 140–150° C., while stirring. After being isolated, washed and dried, the dyestuff is an orange powder which dyes cellulose fibers from a red-orange vat golden yellow tints having good properties of fastness.

The dyestuff can also be obtained directly by the condensation of a mixture of 1-amino-6-methoxy-anthraquinone and 1-amino-7-methoxy-anthraquinone with cyanuric chloride followed by reaction with aniline without isolating the intermediate product.

By using, instead of the above mixture, 1-amino-6-methoxyanthraquinone alone there is obtained a dyestuff which dyes cotton somewhat more greenish tints.

Example 4

1 part of 4-diphenyl-carboxylic acid is heated in 20 parts of ortho-dichlorobenzene with 1.2 parts of thionyl chloride for one hour at 140–150° C., while stirring, during which the acid dissolves with the formation of the acid chloride. After distilling off the excess of thionyl chloride, 1.2 parts of a mixture of 1-amino-6-methoxyanthraquinone and 1-amino-7-methoxyanthraquinone is introduced at 100° C., and the whole is heated for a further 3 hours at 140–150° C. After cooling the mixture, the dyestuff that crystallizes out is filtered off, washed and dried. It is a yellow powder which dyes cellulose fibers from a Bordeaux red vat yellow tints.

Example 5

2.4 parts of a mixture of 1-amino-6-methoxyanthraquinone and 1-amino-7-methoxy-anthraquinone are dissolved in 40 parts of ortho-dichlorobenzene at 120° C. 1 part of isophthalyl chloride in 5 parts of ortho-dichlorobenzene is then added dropwise, while stirring, and the whole is stirred for 3 hours at 145° C. The dyestuff crystallizes out upon cooling the mixture, and is filtered off, washed and dried. It is a yellow crystalline powder which dyes cellulose fibers from a Bordeaux red vat fast yellow tints.

Example 6

1 part of azodiphenyl-4:4'-dicarboxylic acid in 30 parts of orthodichlorobenzene is heated with 1.1 parts of thionyl chloride, while stirring, for 3 hours at 140–150° C., during which the acid dissolves with the formation of the acid chloride. After distilling off the excess of thionyl chloride, 1.1 parts of a mixture of 1-amino-6-methoxyanthraquinone and 1-amino-7-methoxy-anthraquinone are added at 110° C., and the whole is heated for a further 3 hours at 140–150° C. The dyestuff separates out from the hot mixture in the form of a sparingly soluble precipitate, and, after cooling the mixture, the dyestuff is filtered off and washed. When dry it is a dark yellow crystalline powder which dyes cellulose fibers from a red-brown vat fast yellow tints.

Example 7

1 part of azobenzene-para:para'-dicarboxylic acid is converted into the acid chloride in 40 parts of ortho-dichlorobenzene with 1.7 parts of thionyl chloride as described in Example 6, and the acid chloride is condensed with 1.7 parts of a mixture of 1-amino-6-methoxyanthraquinone and 1-amino-7-methoxy-anthraquinone for 3 hours at 140–150° C. The dyestuff is isolated in the usual manner and dried, and is a dark yellow crystalline powder which dyes cellulose fibers from a red vat fast yellow tints.

Example 8

12 parts of thianthrene dicarboxylic acid are suspended in 520 parts of ortho-dichlorobenzene and, after the addition of 24 parts of thionyl chloride and 1 drop of pyridine, the whole is heated for 30 minutes at 140–150° C., during which the thianthrene dicarboxylic acid dissolves with the formation of its acid chloride. The excess of thionyl chloride is then distilled off together with about 120 parts of ortho-dichlorobenzene, in vacuo, at 100° C. a warm solution of 27.8 parts of a mixture of 1-amino-6-methoxy-anthraquinone and 1-amino-7-methoxy-anthraquinone is added and the whole is heated for 3 hours at 140–150° C. After being isolated in the usual manner the dyestuff is a brown-red powder. For the purpose of purification it is reprecipitated from sulfuric acid of 90% strength at 0–5° C., and is then treated for 1 hour at the boil with a dilute solution of sodium hypochlorite. The purified dyestuff is a dark yellow powder which dyes cellulose fibers from red-brown vat yellow tints having good properties of fastness.

Example 9

3 parts of 1:9-anthrapyrimidine-2-carboxylic acid are heated for one hour in 130 parts of ortho-dichlorobenzene with 3 parts of thionyl chloride at 115–130° C., whereby the acid chloride is formed. The excess of thionyl chloride is distilled off in vacuo together with 30 parts of ortho-dichlorobenzene. At 100° C. 2.6 parts of a mixture of 1-amino-6-methoxyanthraquinone and 1-amino-7-methoxyanthraquinone are introduced and the whole is stirred for 3 hours at 115–130° C. The dyestuff is isolated in the usual manner, and can then be purified by reprecipitation from sulfuric acid of 90% strength at 0–5° C. followed by treatment with a dilute solution of sodium hypochlorite. It is a yellow-brown powder which dyes cellulose fibers from a red-orange vat yellow tints having good properties of fastness.

What is claimed is:

1. An anthraquinone vat dyestuff of the formula

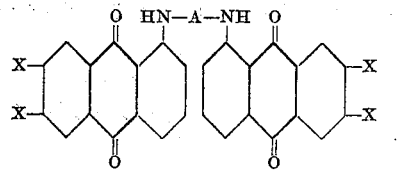

in which one X in each anthraquinone nucleus is a methoxy group, whereas the other X in said nucleus is a hydrogen atom, A is a member selected from the group consisting of the radicals of the formula

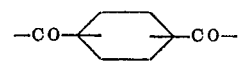

and

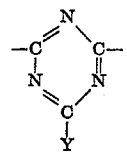

wherein Y is a member selected from the group consisting of a chlorine atom, amino, alkylamino and arylamino groups.

2. An anthraquinone vat dyestuff of the formula

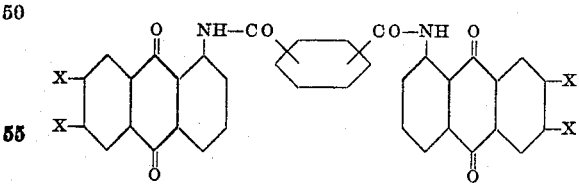

wherein in each anthraquinone nucleus one X is a methoxy group and the other X is a hydrogen atom.

3. An anthraquinone vat dyestuff of the formula

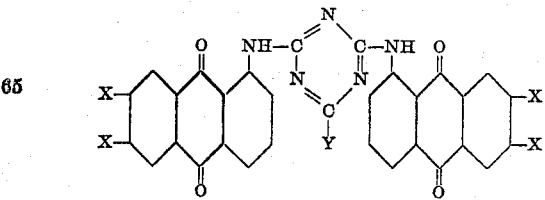

in which one X is an alkoxy group having at most 4 carbon atoms the other X is a hydrogen atom, and Y represents a member selected from the group consisting of a chlorine atom, an amino group, an alkylamino group and an arylamino group.

4. An anthraquinone vat dyestuff of the formula

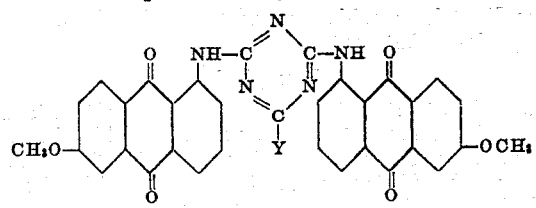

in which Y represents a member selected from the group consisting of a chlorine atom, an amino group, an alkylamino group and an arylamino group.

5. The anthraquinone vat dyestuff of the formula

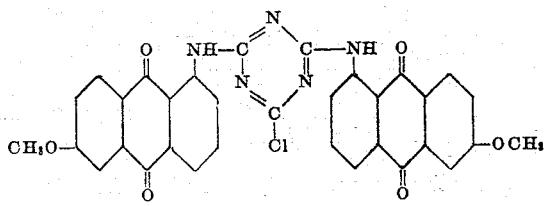

6. The anthraquinone vat dyestuff of the formula

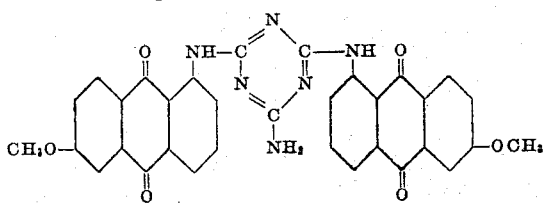

7. The anthraquinone vat dyestuff of the formula

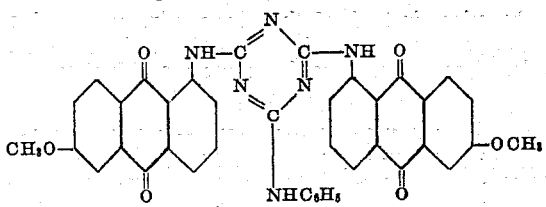

8. The anthraquinone vat dyestuff of the formula

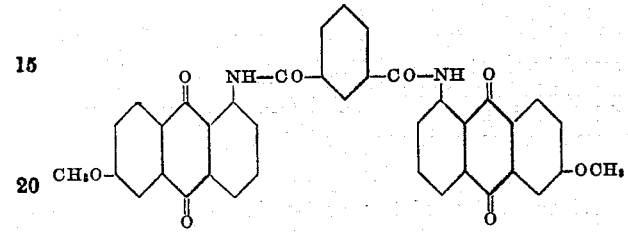

References Cited in the file of this patent
UNITED STATES PATENTS

| | | |
|---|---|---|
| 2,228,455 | Honold et al. | Jan. 14, 1941 |
| 2,235,480 | Graenacher et al. | Mar. 18, 1941 |
| 2,691,018 | Joyce et al. | Oct. 5, 1954 |
| 2,735,849 | Ebel et al. | Feb. 21, 1956 |

FOREIGN PATENTS

| | | |
|---|---|---|
| 844,756 | France | Apr. 24, 1939 |